United States Patent
Kuehl

[11] Patent Number: 5,784,796
[45] Date of Patent: Jul. 28, 1998

[54] LINEAL COUNT RECORDER

[75] Inventor: Wesley C. Kuehl, Greenwood, Wis.

[73] Assignee: Owen Manufacturing Inc., Owen, Wis.

[21] Appl. No.: 615,854

[22] Filed: Mar. 12, 1996

[51] Int. Cl.$^6$ .................. G01B 5/04; B65H 7/02
[52] U.S. Cl. .................. 33/739; 33/747; 271/265.01
[58] Field of Search .............. 33/18.1, 732, 733, 33/747, 748, 750; 271/265.01

[56] References Cited

U.S. PATENT DOCUMENTS

| | | |
|---|---|---|
| 2,557,450 | 6/1951 | Mentzel . |
| 3,015,165 | 1/1962 | Steele ........................ 33/748 |
| 3,050,857 | 8/1962 | Pierce et al. . |
| 3,157,952 | 11/1964 | Laycak et al. . |
| 3,397,315 | 8/1968 | Johnston . |
| 3,656,239 | 4/1972 | Hutchinson et al. . |
| 3,786,736 | 1/1974 | Neeb et al. . |
| 3,969,826 | 7/1976 | Ottenhues et al. . |
| 4,149,318 | 4/1979 | Schaaf . |
| 4,488,797 | 12/1984 | Funk . |
| 4,577,411 | 3/1986 | Martin . |
| 4,700,940 | 10/1987 | King . |
| 5,069,438 | 12/1991 | Urban et al. ............... 271/265.01 X |
| 5,245,760 | 9/1993 | Smart et al. ............... 33/747 X |
| 5,397,107 | 3/1995 | Wolog et al. ............... 271/265.01 X |

FOREIGN PATENT DOCUMENTS 733141   3/1943   Germany ........................ 33/758

Primary Examiner—Michael Mansen
Attorney, Agent, or Firm—Shoemaker and Mattare, Ltd.

[57] ABSTRACT

An engineering drawing copier includes a device for measuring and recording cumulative movement of the copier's paper feed belt only when paper is present at the exposing lamp. A correct cumulative paper length is generated, notwithstanding variations in the size and shape of the sheets which have been copied.

5 Claims, 3 Drawing Sheets

LINEAL COUNT RECORDER

BACKGROUND OF THE INVENTION

This invention relates to the art of measurement and more particularly to a lineal count recorder for measuring paper usage in a diazo copy machine, white print machine, blue line machine, or blueprint machine, all of which we refer to hereafter by the generic term "engineering drawing copier".

It is important to be able to monitor the usage of an engineering drawing copier, so that media usage and machine wear and tear can be accurately evaluated. Blueprints and the like pose a difficult problem, in that they may be of different lengths. Just counting copies does not accurately measure use.

Prior counters measured machine and media use in terms of copies made. They were accurate only when material of a known standard size was used.

An additional consideration is that in machines which operate continuously, whether or not paper is present, is it not possible to infer paper usage by counting machine element rotation.

SUMMARY OF THE INVENTION

An object of the invention is to produce accurate measurements of machine and media usage in an engineering drawing copier, whether or not the copier runs when paper is not present, and whether or not it runs at a constant speed.

Another object of the invention is to provide a device which accumulates unmeasured fractions of a measurement unit, from copy to copy.

These and other objects are attained by a lineal count recorder as described below.

BRIEF DESCRIPTION OF THE DRAWINGS

In the accompanying drawings.

DESCRIPTION OF THE PREFERRED EMBODIMENT

Figure 1:
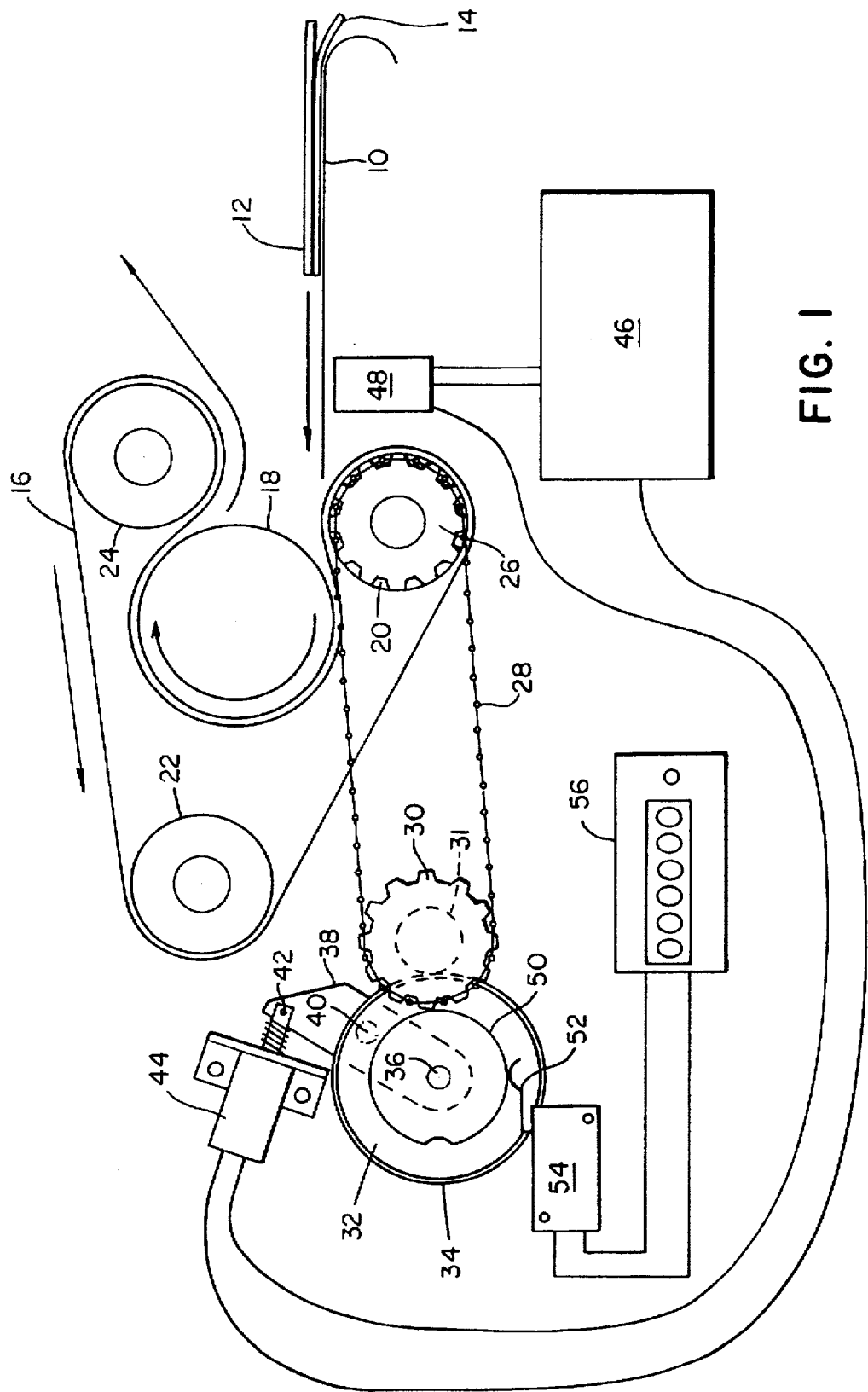
FIG. 1 is a diagrammatic side elevation of a lineal count recorder embodying the invention.
Figure 2:
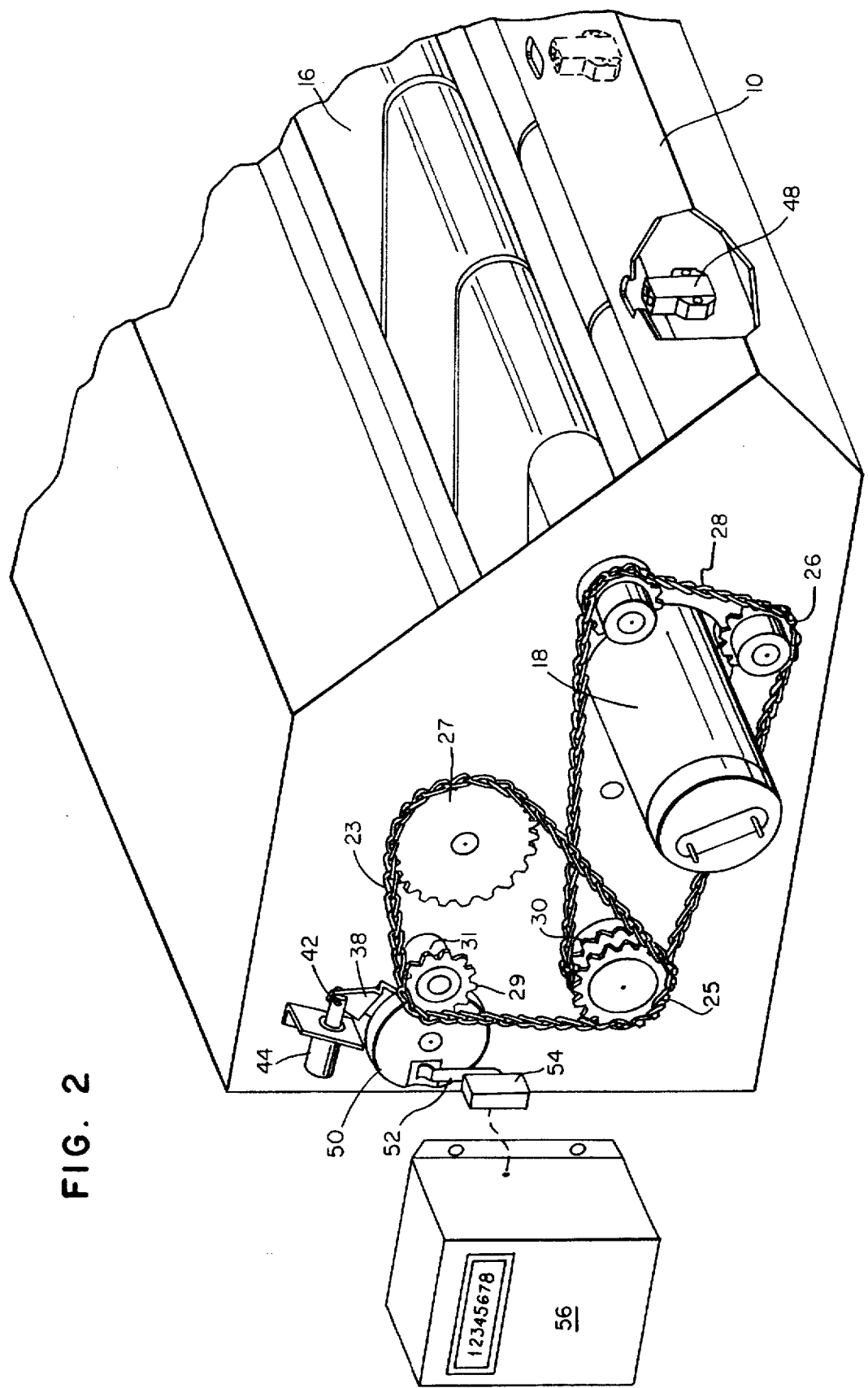
FIG. 2 is a perspective view of an engineering copier with a second embodiment of the lineal count recorder installed.

An engineering drawing copier having a lineal count recorder embodying the invention is shown in FIGS. 1–2. Certain details are different, between the drawings. Only the major components are illustrated.

The engineering drawing copier has an infeed table 10 over which an original drawing 12 and a piece of copy paper 14 are introduced, onto an endless belt 16 which carries the papers in a path extending part way around a transparent exposing lamp 18. The belt's path is defined by three rollers 20, 22, 24, one of which is driven by a motor, not shown. The drive may be continuous, intermittent, and/or variable speed, depending on the type of machine.

As the papers exit the path around the lamp, they are separated from each other by means not shown. The original comes back out onto the infeed table, while the copy remains with the belt for further processing, not described herein.

The lower roller 20 is connected to a sprocket 26, mounted on one end of the roller. A chain 28 runs in a loop around that sprocket, a like sprocket mounted to the end of the upper roller 24, and a remote freewheeling sprocket 30. The embodiment of FIG. 2 differs from that of FIG. 1 in that there is an additional chain 23, running around three freewheeling sprockets 25, 27 and 29. In that case, sprockets 25 and 30 are fixed to a common shaft, and rotate in unison. In either case, the last sprocket in the series has a circular hub 31 whose outer surface is used to drive a wheel 32 having a rubbery surface layer or tire 34.

The wheel is normally idle, turning only when its tire 34 is forced against the hub 31. To engage the tire with the hub, the wheel's axle 36 is mounted on a lever 38 having a fixed pivot point 40. The opposite end of the lever has a pin connection 42 to the plunger of a solenoid 44, or other linear motor. The solenoid is actuated by a controller 46 when the leading edge of the paper passes over a paper sensor 48, which preferably is photoelectric.

As long as the tire is pressed against the hub, the wheel turns, and a cam 50 attached to it rotates as well. This cam has a least one indentation in its end face (FIG. 2) or periphery (FIG. 1) which cycles the arm 52 of a counter switch 54, which arm functions as a cam follower. Although a cam having an indentation is shown, it would of course be possible to replace the indentation with a protuberance or lobe.

Figure 3:
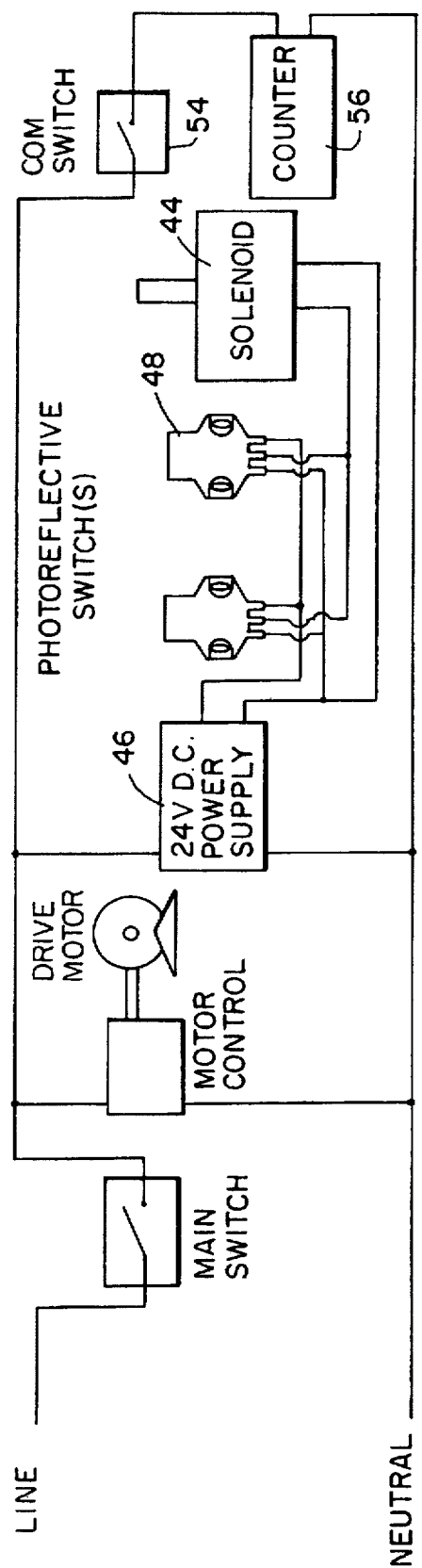
FIG. 3 is an electrical schematic of the invention.

Preferably, the counter switch is electric or electromechanical, and is connected to a digital display 56, as shown in the wiring diagram (FIG. 3). But purely mechanical counters might be used instead. Note that the main switch, motor control and drive motor illustrated are conventional parts of the copier machine.

Now, as long as the paper sensor is blocked, the wheel engages the hub, and turns at a speed proportional to that of the paper. The display continuously indicates accumulated paper length in some predetermined unit of measure, such as feet. Once the trailing end of the paper clears the sensor, the wheel is retracted by the solenoid, out of contact with the hub, and stops turning. Some damping or braking may be built in, if necessary to bring the wheel quickly to a stop. The wheel now remains idle until another paper is introduced into the unit, whereupon the wheel resumes rotation, accumulating fractional turns from one paper to the next. In this way, an accurate measure of accumulated paper length running through the machine is developed.

Since the invention is subject to modifications and variations, it is intended that the foregoing description and the accompanying drawings shall be interpreted as only illustrative of the invention defined by the following claims.

I claim:

1. A lineal count recorder for an engineering drawing copier including exposing means and an endless belt passing over plural rollers for moving the paper past the exposing means, said recorder comprising a paper sensor which indicates when paper is present at the exposing means, a measuring device for measuring belt movement when the device is active and for accumulating measurements made from one active cycle to another and a controller, responsive to the sensor, for activating the measuring device only when paper is sensed at the exposing means, whereby the measured belt movement is accumulated from paper to paper, regardless of paper size, so as to indicate a cumulative total lineal footage of paper fed through the copier.

2. The invention of claim 1, wherein the measuring device comprises a counter, means for incrementing the counter, and means for engaging and disengaging the counter incrementing means with the moving means in response to signals from the controller.

3. The invention of claim 2, further comprising a rotary hub driven by one of the rollers, and wherein the means for incrementing the counting means comprises a wheel, a cam attached to the wheel, and a cam follower connected to the counter, and the engaging and disengaging means comprises a linear motor for moving the wheel toward and away from the hub.

4. The invention of claim 3, further comprising a lever having a fixed pivot point, the wheel being mounted on the lever at a second point, and the linear motor being connected to the lever at a third point.

5. The invention of claim 4, wherein the linear motor is a solenoid.

* * * * *